(12) United States Patent
Fukada

(10) Patent No.: US 11,209,885 B2
(45) Date of Patent: Dec. 28, 2021

(54) INFORMATION PROCESSING APPARATUS, METHOD FOR CONTROLLING THE SAME, AND NON-TRANSITORY COMPUTER-READABLE STORAGE MEDIUM

(71) Applicant: CANON KABUSHIKI KAISHA, Tokyo (JP)

(72) Inventor: Masanori Fukada, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 493 days.

(21) Appl. No.: 15/696,463

(22) Filed: Sep. 6, 2017

(65) Prior Publication Data

US 2018/0074566 A1 Mar. 15, 2018

(30) Foreign Application Priority Data

Sep. 12, 2016 (JP) .............................. JP2016-177865

(51) Int. Cl.

| | |
|---|---|
| *G06F 1/32* | (2019.01) |
| *G06F 1/3203* | (2019.01) |
| *G06F 9/46* | (2006.01) |
| *G06F 9/50* | (2006.01) |
| *G06F 1/3225* | (2019.01) |

(Continued)

(52) U.S. Cl.
CPC .............. *G06F 1/3203* (2013.01); *G06F 1/32* (2013.01); *G06F 1/3225* (2013.01); *G06F 1/3228* (2013.01); *G06F 1/3243* (2013.01); *G06F 1/3275* (2013.01); *G06F 9/461* (2013.01); *G06F 9/5022* (2013.01); *G06F 12/0842* (2013.01); *G06F 9/544* (2013.01);

(Continued)

(58) Field of Classification Search
None
See application file for complete search history.

(56) References Cited

U.S. PATENT DOCUMENTS

| | | | |
|---|---|---|---|
| 5,724,591 A * | 3/1998 | Hara | G06F 1/3215 713/322 |
| 7,249,270 B2 * | 7/2007 | Mansell | G06F 1/3228 711/100 |

(Continued)

FOREIGN PATENT DOCUMENTS

| | | |
|---|---|---|
| JP | 2000105639 A | 4/2000 |
| JP | 2005275771 A | 10/2005 |
| JP | 2008077640 A | 4/2008 |

*Primary Examiner* — Tanh Q Nguyen
(74) *Attorney, Agent, or Firm* — Rossi, Kimms & McDowell LLP

(57) ABSTRACT

An information processing apparatus capable of operating by switching between a first power mode and a second power mode with less power consumption than the first power mode is provided. The apparatus comprises a plurality of processors and a plurality of memories provided in correspondence with the plurality of processors, and controls power supplied to the plurality of processors and the corresponding plurality of memories. When operating in the second power mode, each of the plurality of memories stores a program to be loaded by a corresponding processor of the memory, and when one of the plurality of processors and the corresponding memory operate, power supply to processors and memories other than the one processor and the corresponding memory is limited.

8 Claims, 11 Drawing Sheets

(51) Int. Cl.
   *G06F 1/3234*   (2019.01)
   *G06F 1/3228*   (2019.01)
   *G06F 12/0842*  (2016.01)
   *G06F 9/54*         (2006.01)
   *G06F 12/0862*      (2016.01)

(52) U.S. Cl.
   CPC .. *G06F 12/0862* (2013.01); *G06F 2212/1028* (2013.01); *G06F 2212/452* (2013.01); *Y02D 10/00* (2018.01)

(56) References Cited

U.S. PATENT DOCUMENTS

| | | | |
|---|---|---|---|
| 7,882,379 B2 | 2/2011 | Kanakogi | |
| 8,301,923 B2* | 10/2012 | Aoki | G06F 1/3203 |
| | | | 713/320 |
| 9,442,559 B2* | 9/2016 | Biswas | G06F 1/324 |
| 9,507,404 B2* | 11/2016 | Henry | G06F 1/3287 |
| 10,073,718 B2* | 9/2018 | Therien | G06F 1/324 |
| 2010/0083019 A1 | 4/2010 | Aoki | |
| 2015/0149800 A1* | 5/2015 | Gendler | G06F 1/324 |
| | | | 713/322 |
| 2018/0067542 A1* | 3/2018 | Avoinne | G06F 1/3275 |
| 2018/0074566 A1* | 3/2018 | Fukada | G06F 1/3225 |

* cited by examiner

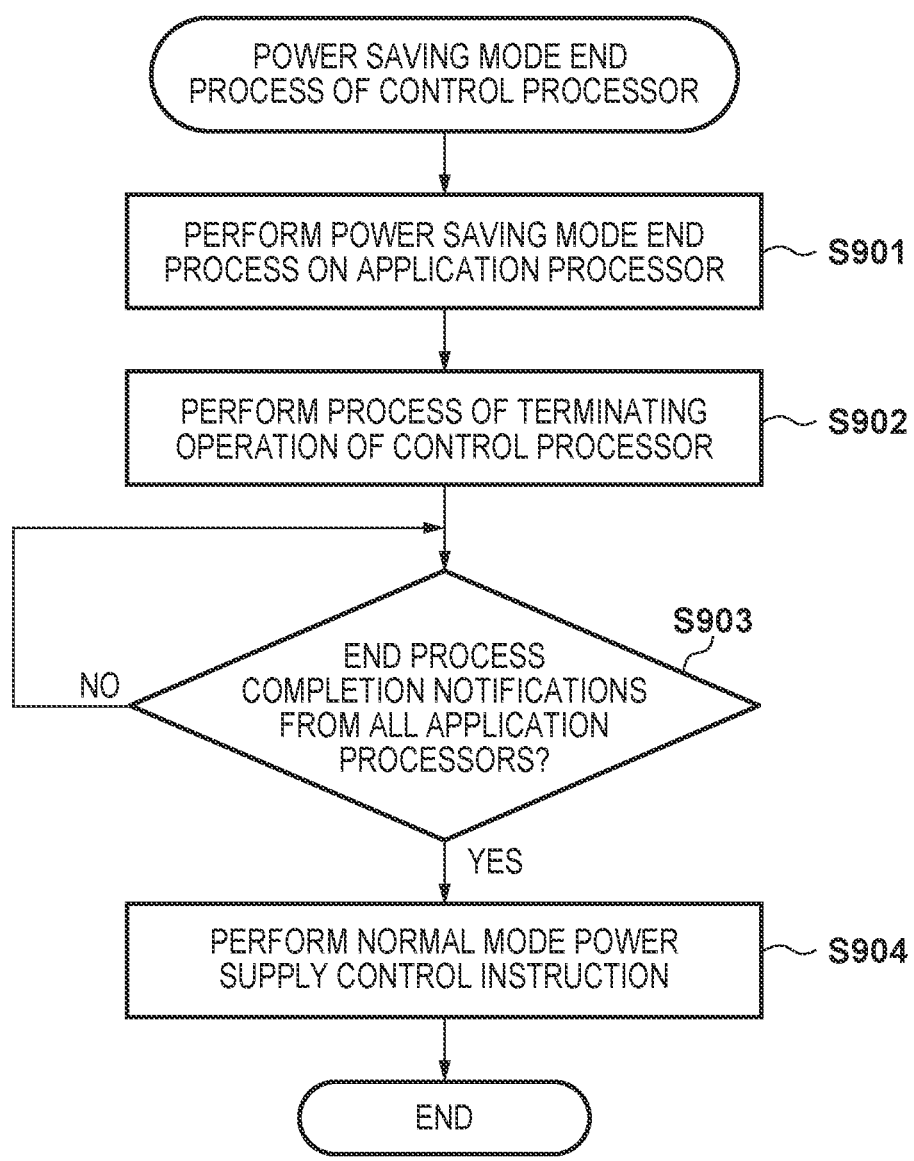

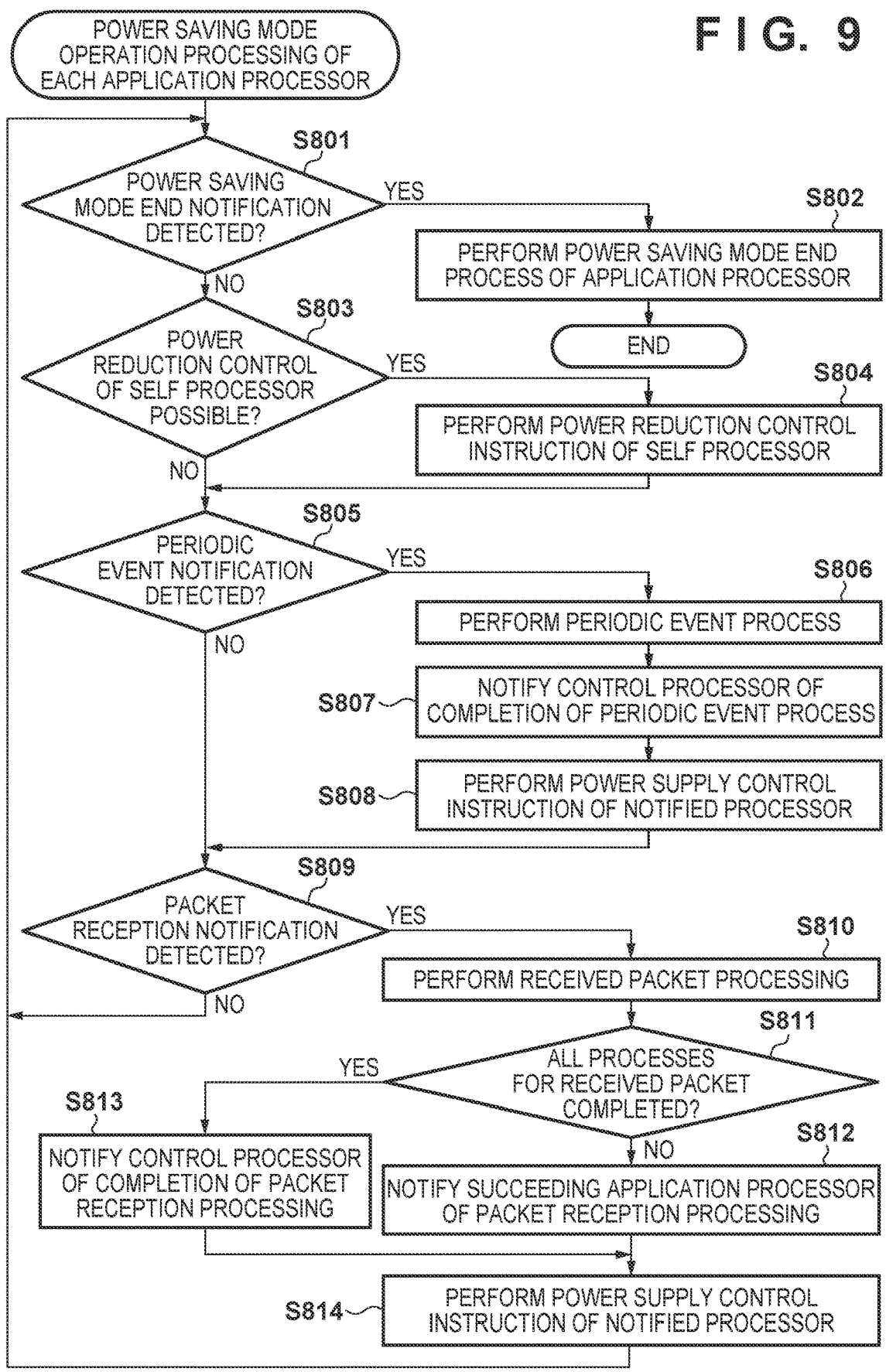

INFORMATION PROCESSING APPARATUS, METHOD FOR CONTROLLING THE SAME, AND NON-TRANSITORY COMPUTER-READABLE STORAGE MEDIUM

BACKGROUND OF THE INVENTION

Field of the Invention

The present invention relates to an information processing apparatus, a method for controlling the same, and a non-transitory computer-readable storage medium.

Description of the Related Art

In recent years, various information processing apparatuses are required to reduce power consumption. On the other hand, various built-in devices or PCs are required to increase a processing speed. A multiprocessor/multicore system incorporating a plurality of processors or a plurality of cores performs parallel or pipeline processing, implementing high-speed processing.

A method for reducing the operating frequency of a processor in a wait state because of occurrence of a resource conflict is known as a configuration for cutting power consumption while implementing high-speed processing by using a plurality of processors (Japanese Patent Laid-Open No. 2008-077640). In this configuration, the power consumption is reduced by performing the high-speed processing by causing the plurality of processors to perform parallel processing or pipeline processing when the resource conflict does not occur and decreasing an operating frequency when the resource conflict occurs.

On the other hand, in order to reduce power consumption at the time of standby when the main function of a device does not operate, a device increases in number which has, besides a normal mode of performing a normal application process, a power saving mode of reducing the power consumption as compared with the normal mode. There are various operations in the power saving mode. An effort to reduce the power consumption is realized by decreasing the operating voltages of some circuits or units that form the device, or stopping power supply. This makes it possible to reduce the power consumption effectively by setting the device in the power saving mode when some functions of the device are not used, the device is set in a standby mode, or the like.

A technique of executing a program arranged in a memory having a low operating voltage in a power saving mode and setting other memories in a power saving state is known as a configuration for reducing power consumption in the power saving mode (see Japanese Patent Laid-Open No. 2000-105639).

In these conventional configurations, execution is made using programs and data arranged in a main storage such as an SDRAM in the normal mode. Then, in the power saving mode, a power saving mode program is executed, without accessing the main storage, using only programs and data arranged in an internal memory such as an SRAM having a lower operating voltage than the main storage. It is possible, by operating while thus switching the memories to use, to reduce the power consumption in the power saving mode. Note that the SDRAM is an abbreviation for Synchronous Dynamic Random Access Memory, and the SRAM is an abbreviation for Static Random Access Memory.

On the other hand, in addition to a recent increase in functions required in the power saving mode, a reduction in power consumption is required more and more. It seems that this trend continues in the future. For example, in an information processing apparatus with a communication function, it is known that a response to a network communication from an external remote controller is sent back while maintaining the communication function in a power saving mode. It is also known that the apparatus recovers a normal mode in response to receiving an activation request by the network communication. Such an information processing apparatus is required to perform communication standby by IPv6 in addition to communication standby by IPv4. Also in the power saving mode, a packet type which sends back a response to a network communication from a remote controller or a packet type which requests activation in the network communication increases in number. While such functional addition is requested, power saving control typified by an ecological design command or ENERGY STAR has become stricter year by year.

If the program is executed by powering off the main storage such as the SDRAM, and by using the programs and data arranged in the internal memory such as the SRAM when a power saving operation is performed, an available memory capacity is restricted while a power saving effect is obtained.

On the other hand, a case increases in number in which the information processing apparatus holds a plurality of processors in order to perform parallel or high-speed processing in the normal mode. In general, these processors individually include a dedicated built-in memory such as a cache. The parallel processing or the high-speed processing is not required when the power saving operation is performed. Thus, the operation is performed by storing the programs and data in a built-in memory such as the SRAM or a built-in memory dedicated to these processors by one processor process.

However, if programs and data increase by the increase in functions, a capacity may run out only with the built-in SRAM or a memory dedicated to one processor. It is therefore considered that a memory capacity is secured by using a built-in memory exclusively held for each of the plurality of processors in an operation across the plurality of processors. However, if the plurality of processors operate in the power saving mode, in addition to increasing power consumption, the plurality of processors operate concurrently even if a performance or parallel operation is not required. Moreover, with the method for reducing the power consumption when there is the resource conflict as in the configuration of Japanese Patent Laid-Open No. 2008-077640, the plurality of processors operate concurrently and consumes much power even if parallel execution is not required when there is no resource conflict. Consequently, power is consumed wastefully when the performance is not required as in the power saving mode.

SUMMARY OF THE INVENTION

The present invention makes it possible to perform a power saving operation with less power consumption in an information processing apparatus which includes a plurality of processors and a plurality of dedicated built-in memories.

According to one aspect of the present invention, there is provided an information processing apparatus capable of operating by switching between a first power mode and a second power mode with less power consumption than the first power mode, the apparatus comprising: a plurality of processors; a plurality of memories provided in correspondence with the plurality of processors; and a power control unit configured to control power supplied to the plurality of processors and the corresponding plurality of memories, wherein when operating in the second power mode, each of the plurality of memories stores a program to be loaded by a corresponding processor of the memory, and when one of the plurality of processors and the corresponding memory operate, the power control unit limits power supply to processors and memories other than the one processor and the corresponding memory.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 8 is a flowchart showing an operation sequence at the end of the power saving mode operation of the control processor; and FIG. 9 is a flowchart showing the processing sequence of a power saving mode operation of each application processor.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment (Arrangement of Information Processing Apparatus)

Figure 1:
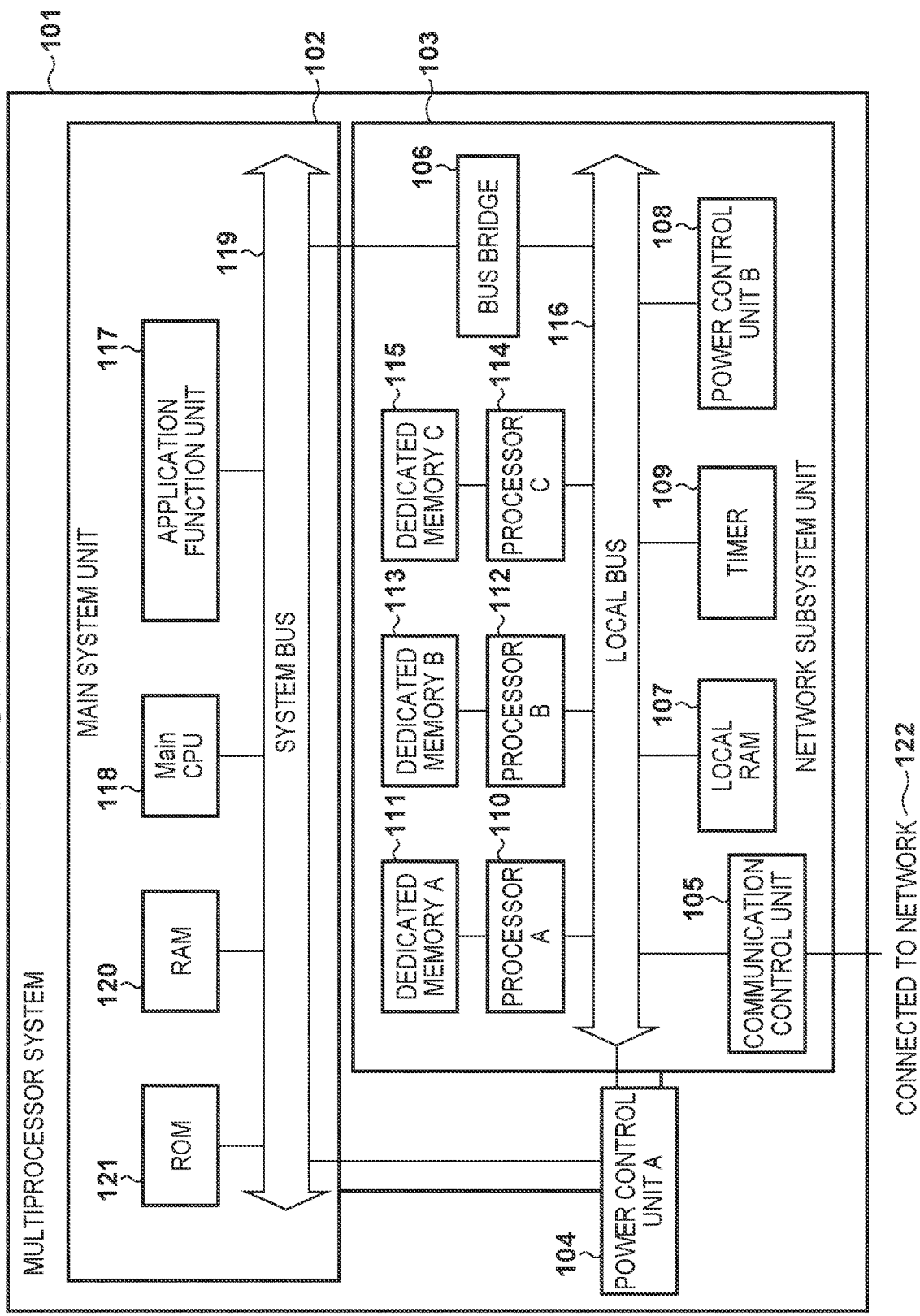
FIG. 1 is a block diagram showing the hardware arrangement of an information processing apparatus.

An example of the hardware arrangement of an information processing apparatus 101 according to the first embodiment of the present invention will be described with reference to FIG. 1. The information processing apparatus 101 includes a main system unit 102, a network subsystem unit 103, and a power control unit A 104.

Network Subsystem Unit

A communication control unit 105 which is connected to a network 122 and transmits/receives a frame, and a local RAM 107 serving as a temporary storage device in a process in the network subsystem unit 103 are connected to a local bus 116 of the network subsystem unit 103. A RAM is an abbreviation for Random Access Memory (writable memory). A processor A 110, a processor B 112, and a processor C 114 which execute programs (computer programs) involving the process of the network subsystem unit are also connected. A dedicated memory A 111, a dedicated memory B 113, and a dedicated memory C 115 each being formed by a cache, an instruction RAM, a data RAN, or the like are connected to the respective processors. A power control unit B 108 which individually controls power of the processor A 110, processor B 112, processor C 114, and other hardware units connected in the network subsystem unit 103 is further connected. The power control unit B 108 performs, on the respective hardware units, power-on control, hardware reset control, and sequence control to activate/stop the overall network subsystem unit 103 safely. The power control unit B 108 also supplies/stops the clocks of the processor A 110, processor B 112, processor C 114, and the other hardware units individually while the network subsystem unit 103 is active. A timer 109 which performs timer processing in a process in the network subsystem unit 103 is further connected.

The network 122 connected by the information processing apparatus 101 is connected to the communication control unit 105. Note that a wired Ethernet® or the like can be assumed as the network 122, but a wireless network, a fiber-optic network, a public communication network such as the Internet, or the like may be used. A remote controller (remote control, not shown) which operates the information processing apparatus 101 can perform communication using a TCP/IP protocol via the network 122. The TCP is an abbreviation for Transmission Control Protocol, and the IP is an abbreviation for Internet Protocol.

The communication control unit 105 transmits/receives a transmission frame to/from the network 122. For example, if the network 122 is the Ethernet®, the communication control unit 105 performs MAC processing (transmission media control processing) of the Ethernet® or transmits/receives the transmission frame.

The processor A 110, the processor B 112, and the processor C 114 perform general-purpose TCP/IP protocol communication processing in a normal power mode. More specifically, they perform communication protocol processing of the IPv4, IPv6, IPsec, ICMP, UDP, or TCP protocol, transmission flow control, congestion control, communication error control, and the like. The ICMP is an abbreviation for Internet Control Message Protocol, and the UDP is an abbreviation for User Datagram Protocol. Processing and some functions by the processors may be configured to perform acceleration by hardware. They can be configured to perform power control independently of each other. These processors use the dedicated memory A 111, the dedicated memory B 113, and the dedicated memory C 115 as primary caches of programs prepared in a RAM 120 in the main system unit 102, or use them as the instruction RAMS or the data RAMS. Furthermore, these processors perform communication processing at a high speed by the parallel or pipeline processing.

The processor A 110, the processor B 112, and the processor C 114 perform, in a power saving mode operation, some processes performed in the normal power mode sequentially by serial processing while controlling power and perform a power saving standby process. They further perform some processes performed by a Main CPU 118 or an application function unit 117 in the normal power mode, and perform remote activation from the remote controller, a proxy response process, or periodical packet transmission processing control.

The local RAM 107 is used as a temporary storage area for data in processing of the communication control unit 105, processor A 110, processor B 112, and processor C 114. The local RAM 107 may also be used as a program storage area at the time of an operation. As will be described later, the local RAM 107 functions as a shared memory that stores programs to be loaded by the plurality of processors 110, 112, and 114 in a power saving mode state, and is accessible by the respective processors. The local RAM 107 may be formed by a plurality of memory chips different in memory size and be switched in accordance with a size needed.

The network subsystem unit 103 includes a bus bridge circuit 106 enabling data transfer between the local bus 116 and a system bus 119 of the main system unit 102. That is, a mechanism is adopted for connecting the bus circuits of the network subsystem unit 103 and main system unit 102, and inter-bus transfer is performed in input/output of communication data.

Main System Unit

The Main CPU 118, a ROM 121 which stores a system program, and the RAM 120 serving as the temporary storage device used when system software or application software are executed are connected to the system bus 119 of the main system unit 102. The CPU is an abbreviation for Central Processing Unit, and the ROM is an abbreviation for Read Only Memory. A software program is loaded from the ROM 121 into the RAM 120, and is executed by the Main CPU 118 and the processor A 110, processor B 112, and processor C 114 in the network subsystem unit in the normal mode.

The application function unit 117 connected to the system bus 119 in the same manner represents a hardware processing unit used to implement a characteristic application function of the information processing apparatus 101.

Power Control Unit

The power control unit A 104 is a power control unit which controls power supply of the network subsystem unit 103 and main system unit 102 independently. The power control unit A 104 performs, on respective apparatuses, power-on control, hardware reset control, and further sequence control to activate/stop the overall information processing apparatus 101 safely. The power control unit A 104 is connected to the network subsystem unit 103 and main system unit 102 by a control signal line, and also performs mode transition operation control in respective states of a normal power state and power-saving mode state.

The main function of the information processing apparatus 101 is implemented by the main system unit 102. An application program executed by the Main CPU 118 can perform network communication. Communication by an application is communication based on the TCP/IP protocol. As described above, this TCP/IP protocol processing is executed in the network subsystem unit 103.

In the power saving mode state, when one of the plurality of processors A, B, and C and the corresponding dedicated memory are operated, the power control unit B 108 limits power supply to the processors and dedicated memories other than the one processor and the corresponding dedicated memory. As a result, power is supplied only to a minimum processor and memory needed for the operation in an arrangement with the plurality of processors and the plurality of dedicated memories, making it possible to achieve power saving.

(Power Consumption State)

Figure 2:
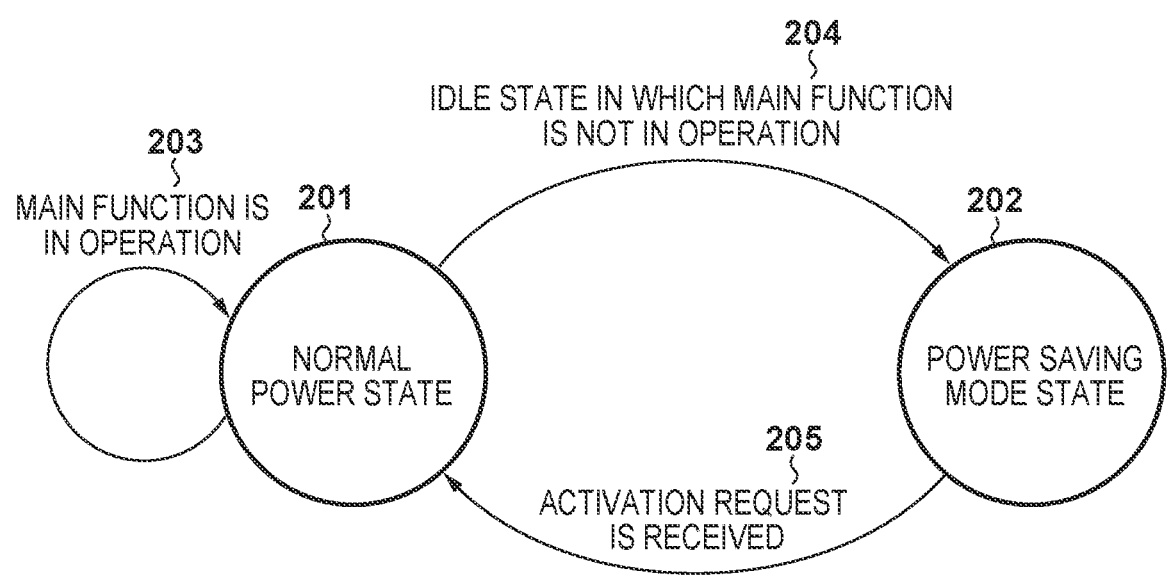
FIG. 2 is a view showing a change in the power consumption state of the information processing apparatus.

The information processing apparatus 101 having the above-described arrangement can transit to the power saving mode state in an idle state in which the main function is not in operation. This will be described with reference to FIG. 2. FIG. 2 is a transition view showing the power consumption state of the information processing apparatus 101.

Reference numeral 201 denotes a normal power state, and reference numeral 202 denotes a power saving mode state. The normal power state 201 is maintained while the main function of the information processing apparatus 101 is in operation 203. In the normal power state 201, power is supplied to the overall information processing apparatus 101 including the main system unit 102. When the idle state is set in which the main function is not in execution in the normal power state 201, it becomes possible to transit to the power saving mode state 202.

On the other hand, in the power saving mode state 202, power is supplied only to the network subsystem unit 103 and the power control unit A (power saving mode control unit) 104. Furthermore, the network subsystem unit 103 causes the power control unit A 104 to perform fine control in accordance with an operation mode so as to supply power only to a hardware resource needed. Consequently, the power saving mode state 202 enters a power mode with less power consumption than the normal power state. The power of the main system unit 102 is in an OFF state, and thus the system bus 119, the Main CPU 118, the RAM 120, and the ROM 121 are stopped. Switching from the power saving mode state 202 to the normal power state 201 is performed when, for example, the information processing apparatus 101 receives a system activation request from the network 122 (205). The power control unit A 104 is connected to an external switch operable from the user, and a transition from the power saving mode state 202 to the normal power state 201 may also be taken place by pressing the switch. The power saving mode state 202 includes a plurality of modes of operating in accordance with a user setting or the use status of a network.

(Power Saving Mode Transition Process of Main CPU)

Figure 3:
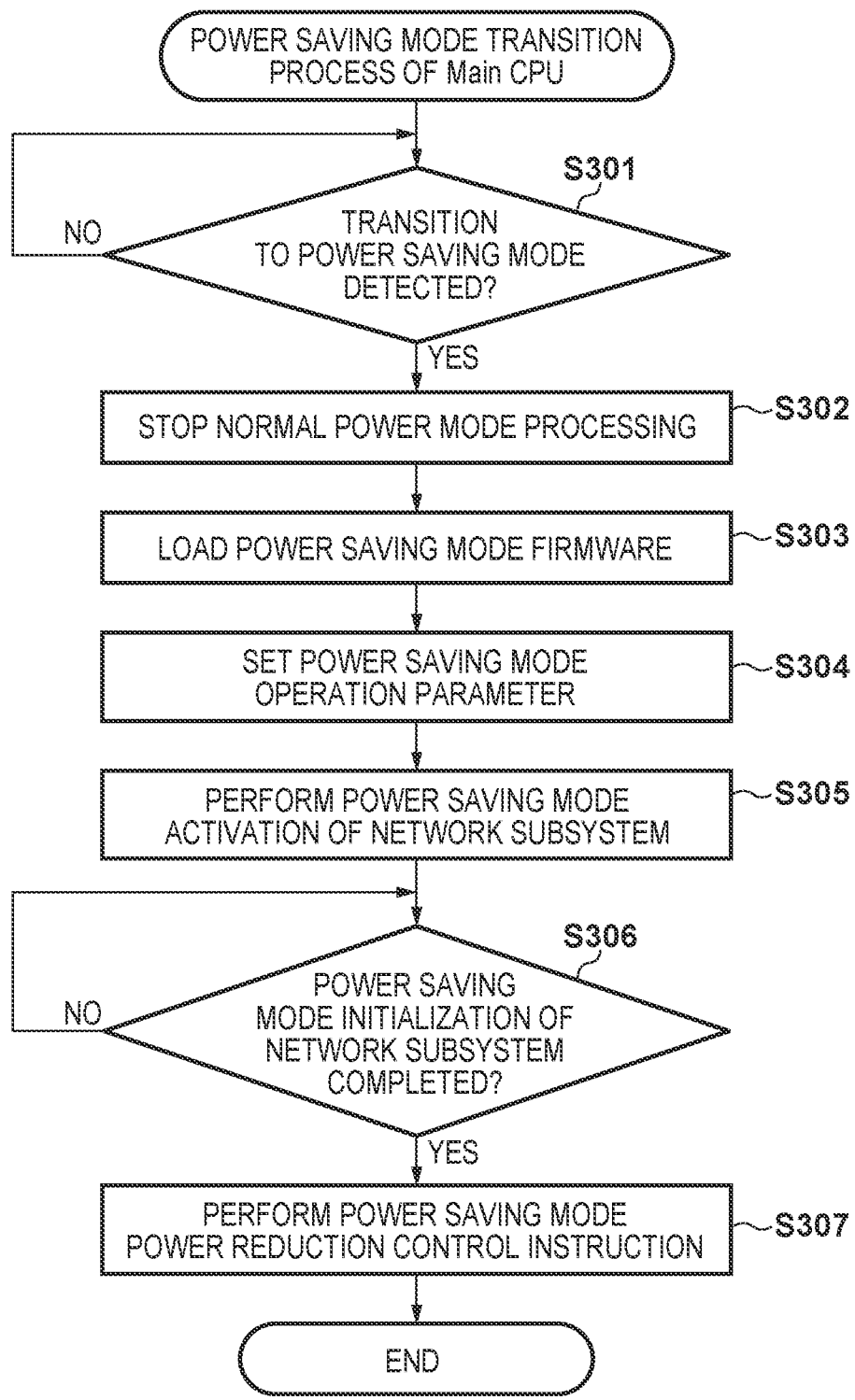
FIG. 3 is a flowchart showing a power saving mode transition process of a Main CPU.

A process (power saving mode transition process) in which the Main CPU 118 in the information processing apparatus 101 transits to the power saving mode when a state changes from the normal power state 201 to the power saving mode state 202 will now be described with reference to FIG. 3. FIG. 3 is a flowchart showing the procedure of the power saving mode transition process of the Main CPU 118. The following steps are performed based on the control of the Main CPU 118.

In step S301, the Main CPU 118 determines whether to detect that the information processing apparatus 101 may transit to the power saving mode by the control of the main system unit 102. If the information processing apparatus 101 may not transit to the power saving mode (NO in step S301), a process in the normal power mode is continued, and the information processing apparatus 101 operates in the normal power mode until a condition is detected on which it may transit to the power saving mode. If the transition to the power saving mode is detected (YES in step S301), the Main CPU 118 starts the power saving mode transition process, and the process advances to step S302.

In step S302, the Main CPU 118 stops the process executed in the normal power mode and prepares to transit to the power saving mode safely. If a socket or the like for executing communication processing exists, the Main CPU 118 instructs the network subsystem unit 103 to terminate the socket. Then, the Main CPU 118 stops the operation of the network subsystem unit 103. If the application function unit 117 executes a process, the Main CPU 118 makes a process termination request to the application function unit 117. Once a preparation for the termination of the process executed in the normal power mode is completed, the process advances to step S303.

In step S303, the Main CPU 118 loads, from the ROM 121 into the RAM 120, firmware for the power saving mode operation operated by the processor A 110, processor B 112, and processor C 114 in the network subsystem unit 103 in the power saving mode.

In step S304, the Main CPU 118 sets system information stored in the RAM 120 in the local RAM 107 in the network subsystem unit 103 in order to hand over system information in the normal power mode to the power saving mode operation. The Main CPU 118 additionally sets, in the local RAM 107, an activation condition from the power saving mode needed as the power saving mode operation and various parameters needed by the firmware in the power saving mode. This system information contains, for example, device information such as an IP address or a MAC address, or information such as a packet type or a port number serving as the activation condition. Furthermore, the Main CPU 118 additionally sets a parameter which needs power saving mode firmware for an application process and a parameter, data, cache, and the like needed as dynamically decided system information.

Figure 5:
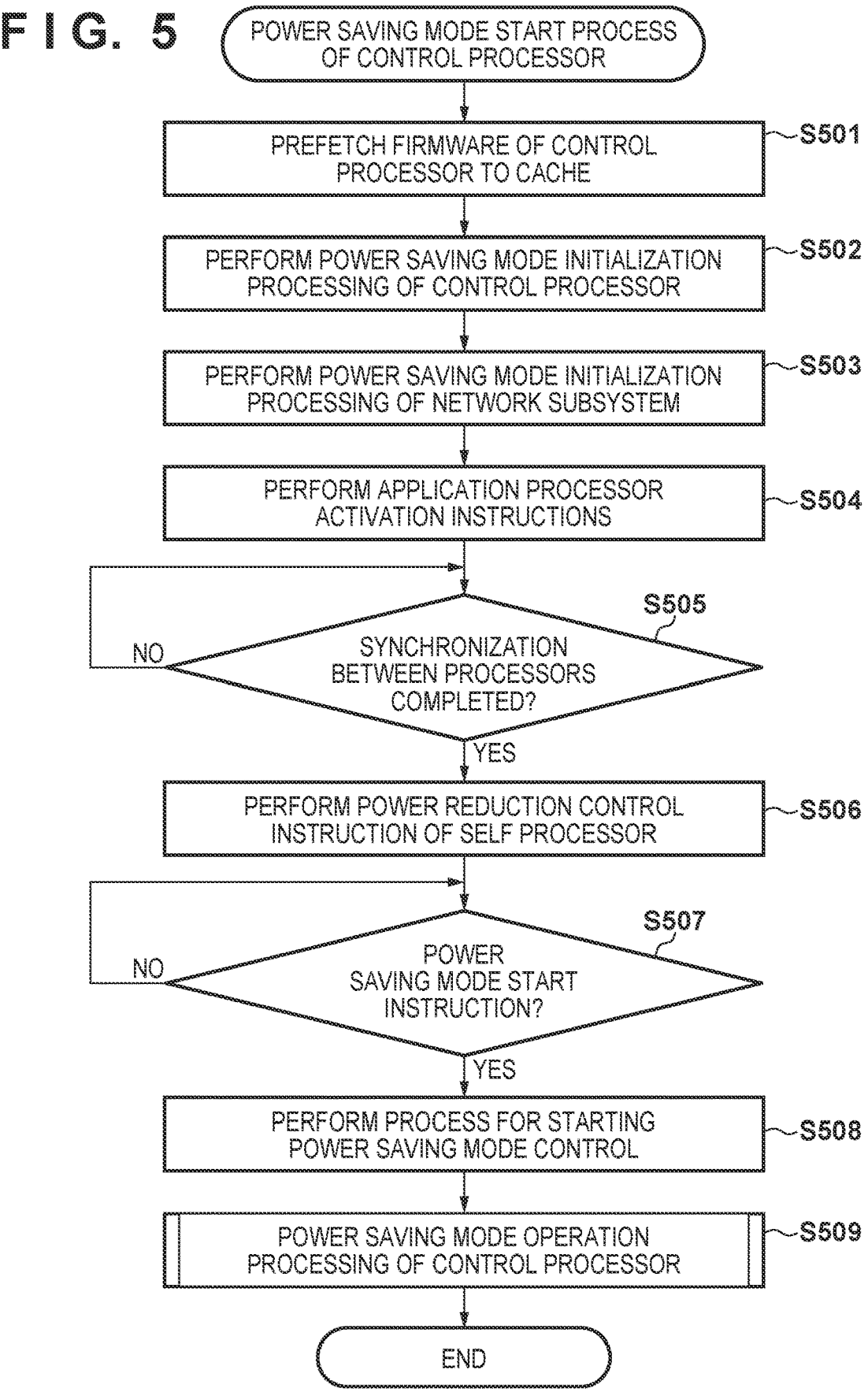
FIG. 5 is a flowchart showing a processing sequence at the start of the power saving mode of a control processor.
Figure 6:
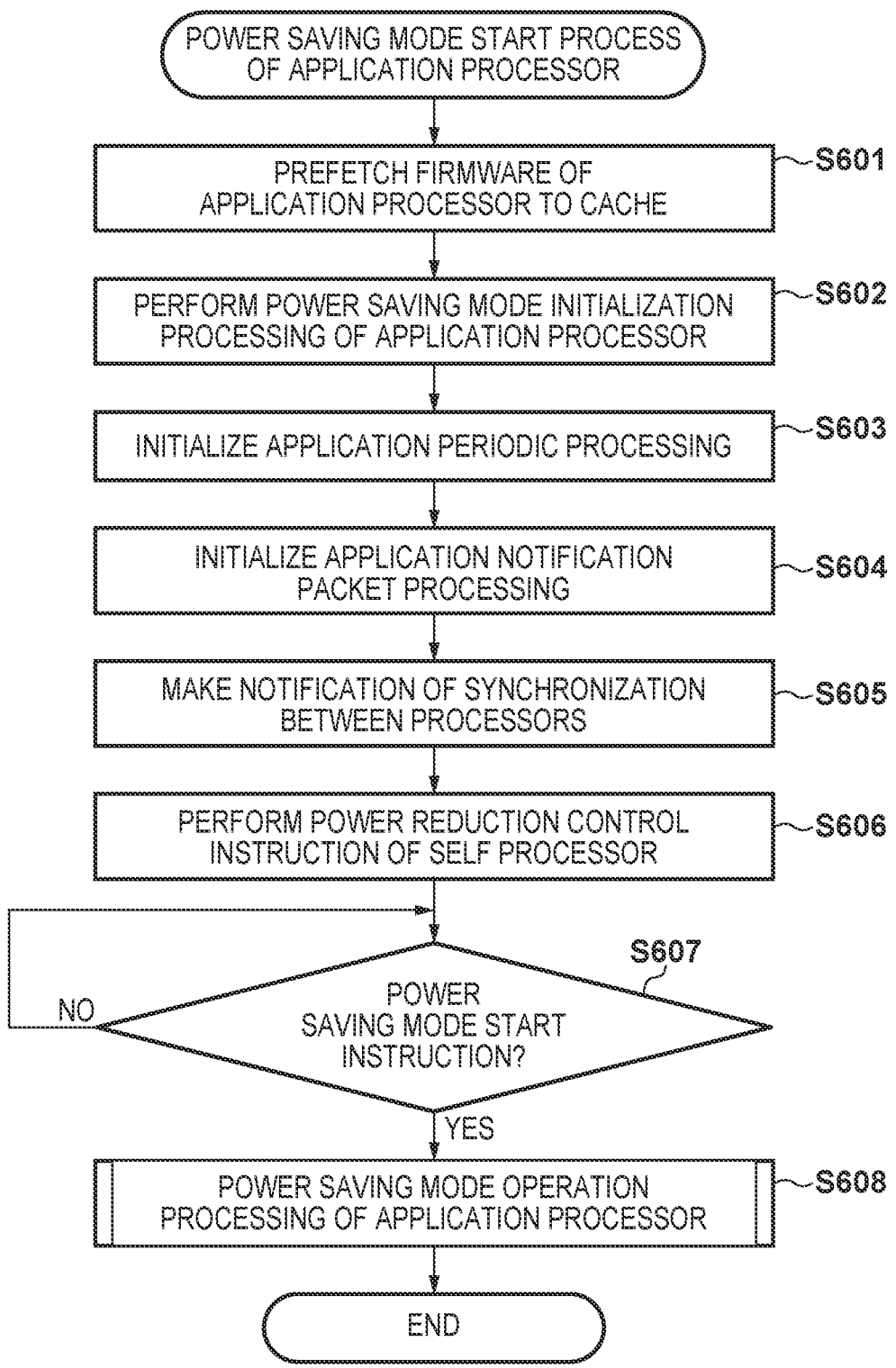
FIG. 6 is a flowchart showing a processing sequence at the start of the power saving mode of each application processor.

In step S305, the Main CPU 118 performs a power saving mode activation instruction of the network subsystem unit 103. The Main CPU 118 performs a power saving mode activation instruction on the processor A 110 in the network subsystem unit 103 which is operated as a control processor for the overall power saving mode in the power saving mode. Note that in this embodiment, an example will be described in which the processor A 110 is used as the control processor to aggregate overall control, and the processor B 112 and the processor C 114 are assigned as application processors. However, software may be arranged in anyway. That is, the processor B 112 or the processor C 114 may function as a control processor, or a plurality of processors may cooperate to operate as control processors. When the network subsystem unit 103 is activated, the completion of initialization processing of the power saving mode operation to be described later with reference to FIGS. 5 and 6 is waited in step S306. The initialization processing of the power saving mode operation of the network subsystem unit 103 is completed (YES in step S306), the process advances to step S307.

In step S307, the Main CPU 118 instructs the power control unit A 104 to control a power saving mode power reduction, terminating the process. A process for transiting to the power saving mode is performed with the above sequence.

(Power Saving Mode Transition Process of Power Saving Control Unit)

Figure 4:
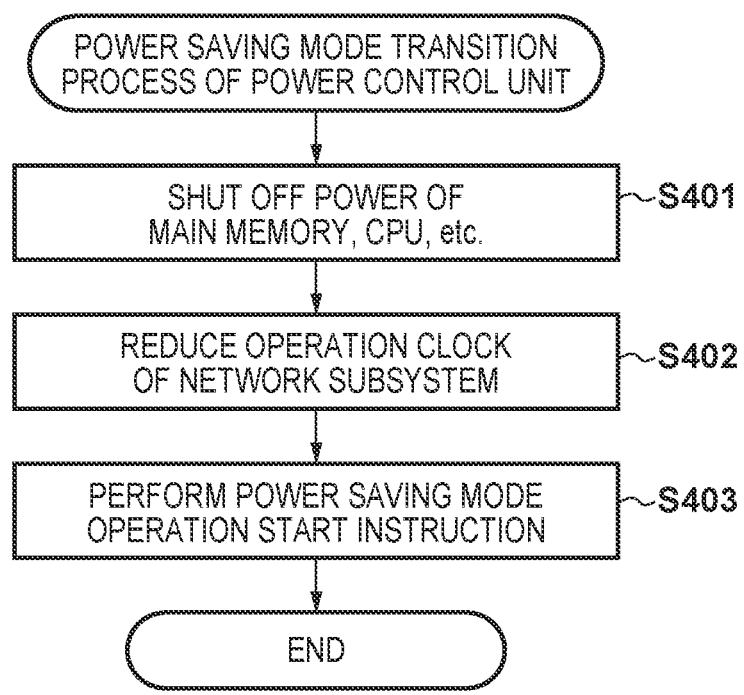
FIG. 4 is a flowchart showing the sequence of a power saving mode transition process of a power control unit.

A process (power saving mode transition process) for the power control unit A 104 that accepts the instruction from the Main CPU 118 in step S307 of FIG. 3 to cause the information processing apparatus 101 to transit to the power saving mode operation will now be described with reference to FIG. 4. FIG. 4 is a flowchart showing the procedure of the power saving mode transition process of the power control unit A 104. The following steps are performed based on the control of the power control unit A 104.

In step S401, the power control unit A 104 shuts off the power of the overall main system unit 102 including the Main CPU 118, the RAM 120, the ROM 121, and the application function unit 117.

In step S402, the power control unit A 104 reduces the operation clock of the network subsystem unit 103.

Then, in step S403, the power control unit A 104 instructs the processor A 110 operating as the control processor in the network subsystem unit 103 to start an operation, terminating the process. A process of switching over to the power saving mode is performed with the above sequence.

(Power Saving Mode Start Process of Control Processor)

A process (power saving mode start process) in which the processor A 110 operating as the control processor starts the power saving mode will now be described with reference to FIG. 5. FIG. 5 is a flowchart showing the procedure of the power saving mode start process of the control processor. The process of FIG. 5 is started in accordance with the fact that the processor A 110 receives a power saving mode start instruction from the power control unit A 104 in step S403 of FIG. 4. The following steps are performed based on the control of the processor A 110.

In step S501, the processor A 110 prefetches, to the dedicated memory A 111 such as a cache, the programs and data of the processor A 110 operating as the control processor of the power saving mode firmware. As described above, the programs, data, cache, and the like used by the processor A 110 are set in the local RAM 107 in step S304 of FIG. 3. Therefore, in step S501, a process of reading out these pieces of information from the local RAM 107 and prefetching them to the dedicated memory A 111 is performed. As described above, in accordance with switching from the normal power state 201 to the power saving mode state 202, the processor A 110 obtains a program which defines the operation of the processor A in the power saving mode state 202 from the local RAM 107 and stores it in the dedicated memory A 111. As a result, in the power saving mode state, the program to be loaded by the control processor is stored in the dedicated memory corresponding to the control processor. At this time, all the programs executed by the processor A 110 can be stored completely in the dedicated memory A 111. However, if they are not stored completely, the local RAM 107 may be used partially. In this case, if loading of the programs occurs in the power saving mode, they need to be loaded into the local RAM 107. Prefetch of the power saving mode firmware is completed, the process advances to step S502.

In step S502, the processor A 110 performs power saving mode initialization processing of a control processor process. This includes initialization processing of a storage area used when the dedicated memory is executed, initialization of hardware regarding the processor A 110, and initialization processing of a control processor program operation.

Then, in step S503, the processor A 110 performs power saving mode initialization processing of the overall network subsystem unit 103. This includes power saving mode operation settings of the timer 109, communication control unit 105, local RAM 107, and power control unit B 108 in the network subsystem unit 103, a synchronous setting between the processors, and the like.

Then, in step S504, the processor A 110 performs activation instructions on the processor B 112 and the processor C 114 each operating as the application processor. In this embodiment, an example will be described in which the control processor performs application processor activation instructions. Alternatively, the activation instructions may be performed at once when a power saving mode operation start instruction is performed or may be performed in a different order as long as a method capable of achieving consistency in synchronization between the processors or initialization of another process is adopted.

In step S505, the processor A 110 confirms whether a synchronous notification is received from the application processors and determines whether synchronization is completed for all the application processors. As will be described later with reference to FIG. 6, each application processor notifies the control processor, by the synchronous notification, of the completion of the initialization processing in the power saving mode start process. The processor A 110 waits until reception of a completion notification if the synchronization is not completed (NO in step S505) and advances to step S506 if the synchronization is completed (YES in step S505).

In step S506, the processor A 110 instructs the power control unit B 108 to reduce the power of a self processor, and stops the clock of the processor A and waits in step S507 until the power saving mode start instruction is given by the power control unit A 104. Clock supply is resumed from the power control unit B 108 if the power saving mode start instruction is given by the power control unit A 104, and the processor A 110 starts the process and advances to step S508.

In step S508, the processor A 110 performs a process for starting power saving mode control. This performs an instruction to start the timer 109, start instructions to the application processors (the processor B 112 and the processor C 114 in the above-described example), and a process when another power saving mode operation is started.

Then, the process advances to step S509 in which the processor A 110 performs the power saving mode operation of the control processor. If an instruction to terminate the power saving mode operation is received, the process ends. This operation will be described later with reference to FIGS. 7A to 7C. The start process such as initialization before the power saving mode operation of the control processor is performed with the above sequence.

(Power Saving Mode Start Process of Application Processor)

The power saving mode start process of each of the processor B 112 and the processor C 114 operating as the application processor will now be described with reference to FIG. 6. FIG. 6 is a flowchart showing the procedure of the power saving mode start process of each application processor. The process of FIG. 6 is started in accordance with the fact that the control processor performs the activation instruction on each application processor in step S504 of FIG. 5. Steps in FIG. 6 are performed based on the control of the processors each operating as the application processor. The power saving mode start process of the processor B 112 and the power saving mode start process of the processor C 114 are different only in part of prefetching a target program, and thus an example will be described here in which the processor B 112 operates as the application processor.

In step S601, the application processor prefetches, to the dedicated memory B 113 such as a cache, the programs and data of the processor B 112 operating as the application processor of the power saving mode firmware. As described above, the programs, data, cache, and the like used by the processor B 112 are set in the local RAM 107 in step S304 of FIG. 3. Therefore, in step S601, these pieces of information are read out from the local RAM 107 and prefetched. As described above, in accordance with switching from the normal power state 201 to the power saving mode state 202, each application processor obtains a program which defines the operation of the application processor in the power saving mode state 202 from the local RAM 107 and stores it in a corresponding one of the dedicated memories. As a result, in the power saving mode state, the program to be loaded by each application processor is stored in the corresponding one of the dedicated memories corresponding to the application processor. At this time, operated programs and data are application processor programs for the processor B 112. All the programs executed by the processor B 112 can be stored completely in the dedicated memory B 113. However, if they are not stored completely, the local RAM 107 may be used partially. In this case, if loading of the programs occurs in the power saving mode, they need to be loaded into the local RAM 107. Prefetch of the power saving mode firmware is completed, the process advances to step S602.

In step S602, the application processor performs power saving mode initialization processing of an application processor process. This includes initialization processing of the storage area of the dedicated memory B 113 used at the time of execution, initialization of hardware regarding the processor B 112, and initialization processing of an application processor program operation.

In step S603, the application processor performs initialization regarding periodic time processing in an application. This also includes setting of notifying the processor A 110 serving as the control processor of a periodic time. The periodic time here is an interval at which the processing is performed in the application which performs a predetermined process every predetermined time. Note that as a notification method, the local RAM 107 may be used, or inter-processor communication may be used additionally.

Then, in step S604, the application processor initializes packet processing to be notified to the application. In this embodiment, the example has been described in which the packet type or port number which performs the application process is set as the setting from the Main CPU 118 when transiting to the power saving mode in step S304 of FIG. 3. However, the setting may be performed in this step.

In step S605, the application processor notifies the processor A 110 serving as the control processor of the completion of the initialization processing for synchronization between the processors. Note that in this embodiment, synchronization is performed by sending a notification to only the control processor. However, synchronization with the other application processor (for example, the processor C 114) may be performed, or synchronization need not be performed if an operation can be performed safely without synchronization.

Then, in step S606, the application processor instructs the power control unit B 108 to reduce the power of a self processor, and stops the clock of the processor B 112 and waits in step S607 until the power saving mode start instruction is given by the power control unit A 104. Clock supply is resumed from the power control unit B 108 if the power saving mode start instruction is given by the power control unit A 104 (YES in step S606), and the processor B 112 starts the process and advances to step S608. Note that in this embodiment, an operation example has been described in which the start instruction is received from the power control unit A 104. However, the processor A 110 serving as the control processor may perform the start instruction on the application processor.

In step S608, the power saving mode operation of the application processor is performed. The power saving mode operation will be described in detail later with reference to FIG. 9.

Note that the application processor operates by a notification from the control processor. Therefore, immediately after accepting the start instruction (activation instruction) in step S504 of FIG. 5, the application processor instructs the power control unit B 108 again to control the power reduction of the self processor by step S803 to be described later with reference to FIG. 9. Consequently, the application processor stops the clock and waits until reception of an instruction from the control processor while operating in the power saving mode. In this embodiment, there is no start process after an application processor start instruction. As in the control processor process, however, an extra step may be added if there is a process, in addition to the initialization processing, to be performed after the start instruction as the application process. The start process such as initialization before the power saving mode operation of each application processor is performed with the above sequence.

(Power Saving Mode Operation Processing of Control Processor)

Figure 7A:
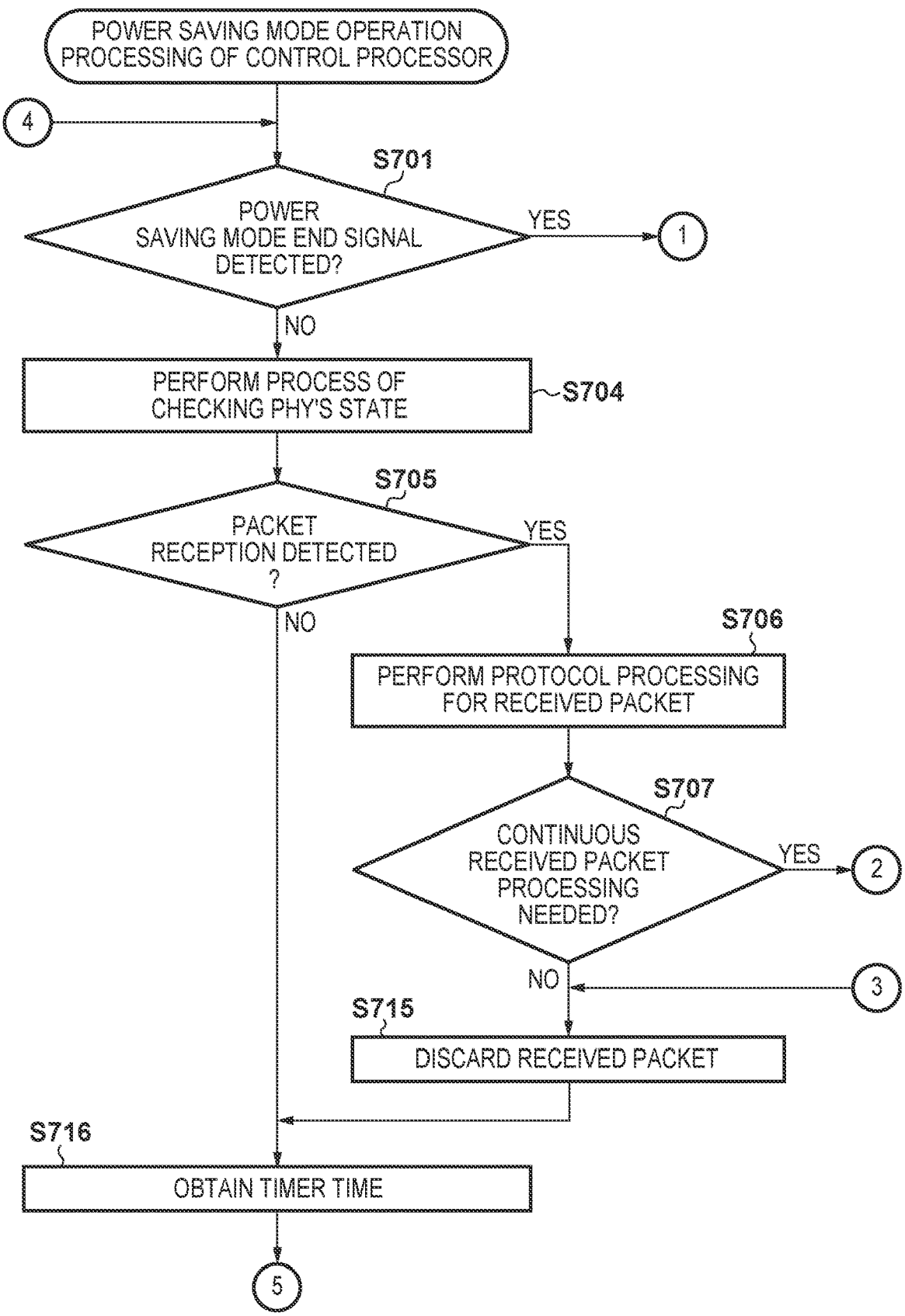
FIGS. 7A to 7C illustrate a flowchart showing the processing sequence of a power saving mode operation of the control processor.
Figure 7B:
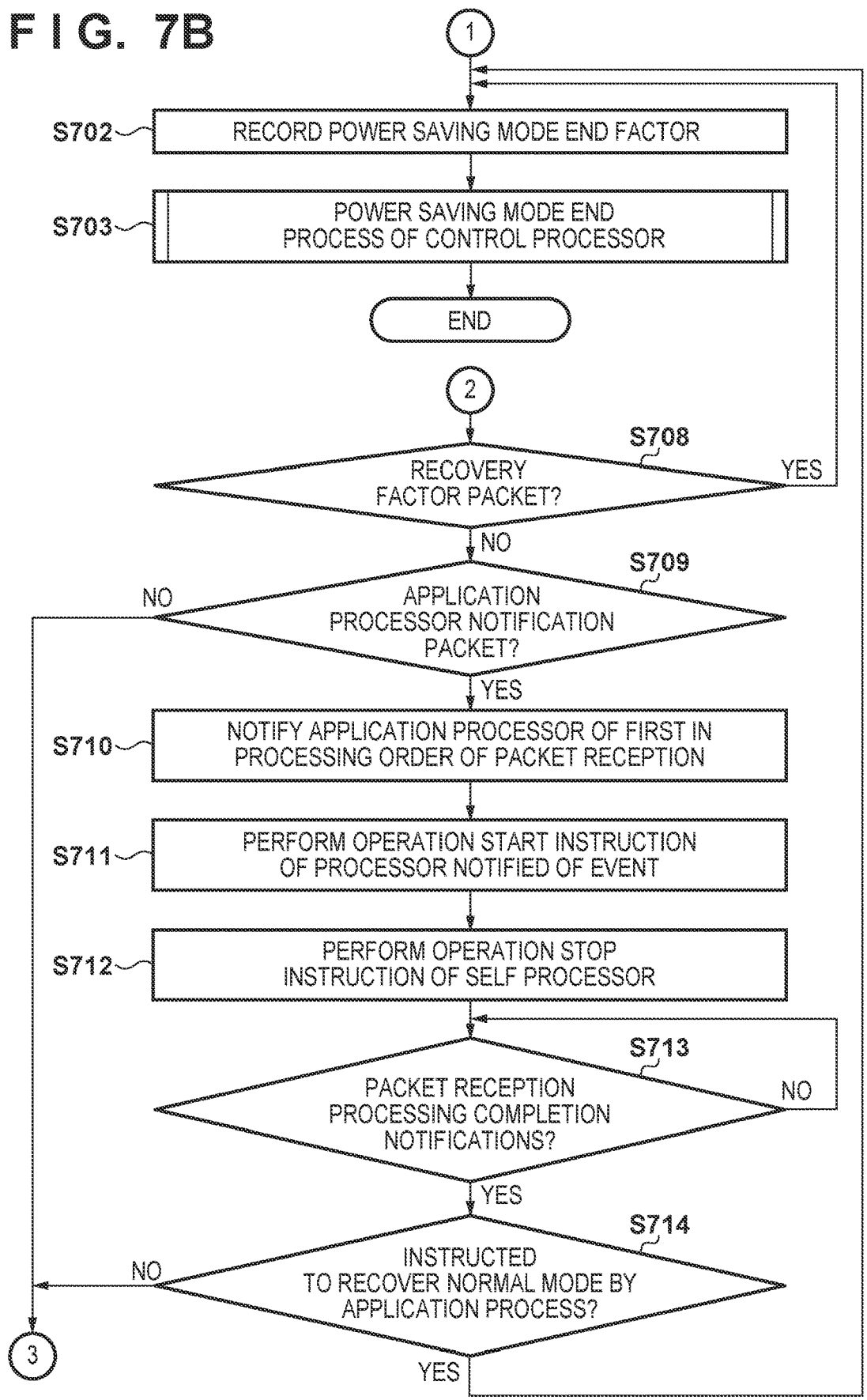
Figure 7C:
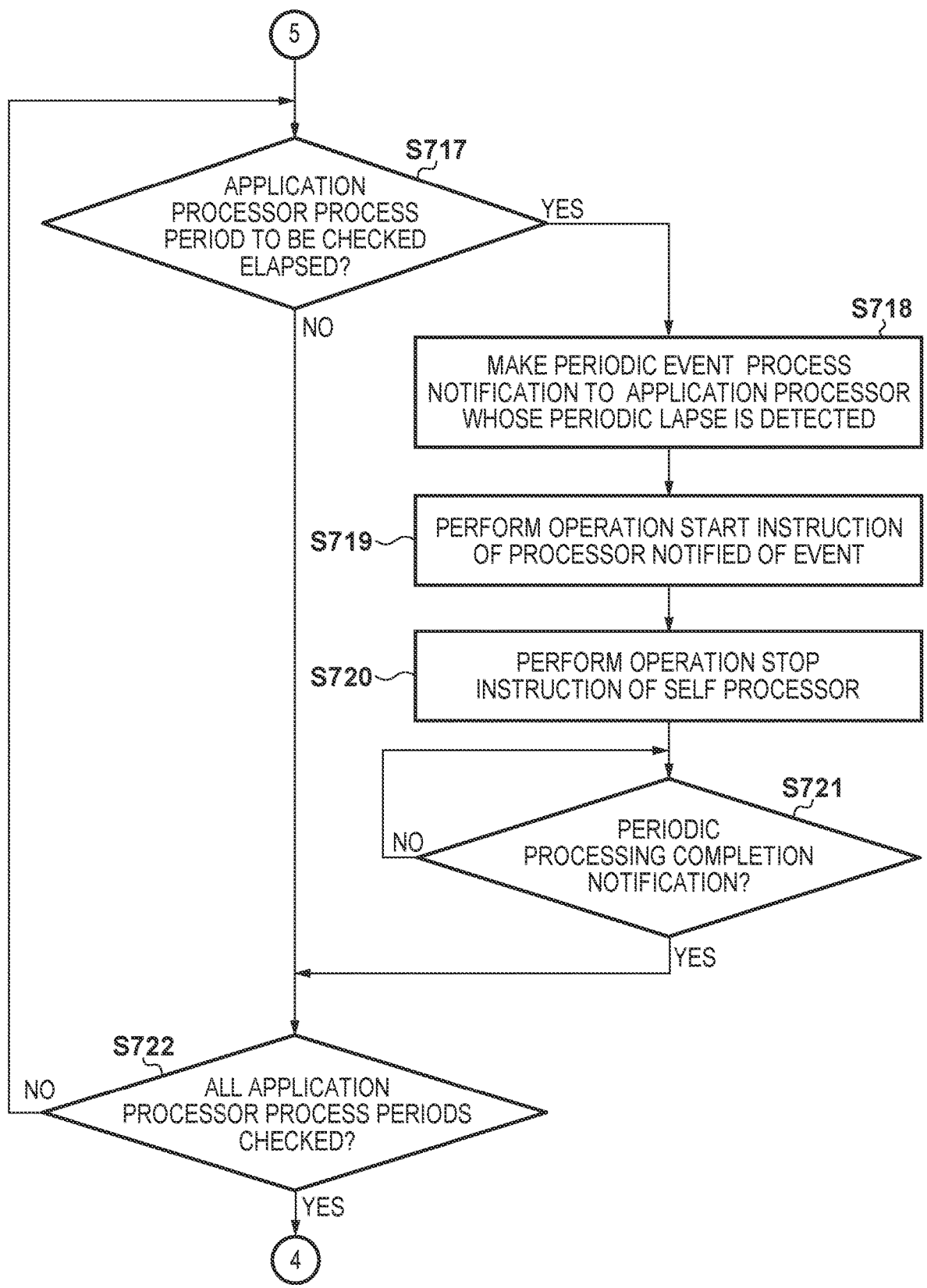

Operation processing of the processor A 110 serving as the control processor while operating in the power saving mode will now be described with reference to FIGS. 7A to 7C. FIGS. 7A to 7C illustrate a flowchart showing the procedure of power saving mode operation processing of the control processor. The following steps are performed based on the control of a control processor (the processor A 110 in the above-described example).

In this embodiment, the control processor determines, in accordance with occurrence of an event, whether the operations of a plurality of processors (application processors) except for the control processor are needed in order to process the event. If the operations are needed, one of the application processors is notified of occurrence of the event, and the power control unit B 108 is instructed to start power supply to the processor and to stop power supply to the control processor. This limits the number of processors operating concurrently and reduces power consumption. Note that as will be described later, the event includes at least one of a timer timeout and packet reception.

In FIGS. 7A to 7C, steps S716 to S722 show a procedure for performing a process performed in a predetermined period by an application. If a received packet is targeted for a specific application, steps S708 to S714 show a procedure for passing the packet to the application processor executing that application and causing it to perform a process. Note that power supply to the control processor is stopped until the application processor completes the process. Steps S702 and S703 show a procedure for recovering the normal operation mode.

When the power saving mode operation is started, in step S701, the control processor determines whether a power saving mode end signal is received and detected. If the end signal is detected (YES in step S701), the process advances to step S702. If the end signal is not detected (NO in step S701), the process advances to step S704. Here, it is confirmed, in accordance with, for example, the button operation of the information processing apparatus 101 or an operation by the remote control or the like via the network 122, whether the power saving mode end signal is received from the power control unit A 104.

In step S704, the control processor checks whether the link state of the network 122 connected to the communication control unit 105 changes. More specifically, for example, when connection is made by the Ethernet, the control processor detects the state change of a physical layer (PHY) such as the state of a link with a device directly connected via the network 122, or whether a communication link speed or the like changes. Note that in this embodiment, an example is assumed in which a processor operating in the power saving mode performs polling processing, and thus it is confirmed in this step whether the state changes directly. However, the confirmation may be implemented by interrupt control or may be made by the control of the communication control unit 105.

Then, in step S705, the control processor confirms whether the packet is received from the remote controller connected via the network 122. If the packet is received (YES in step S705), the process advances to step S706. If the packet is not received (NO in step S705), the process advances to step S716. Note that as in step S704, packet reception is confirmed not with detection by an interrupt but with a confirmation by polling in this embodiment. However, the confirmation may be made by the interrupt.

The control processor obtains time information from the timer 109 in step S716 and determines, in step S717, whether the periodic processing time of an application designated by the application processor has elapsed. Note that in this embodiment, the processor A 110 serving as the control processor confirms a lapse of time. However, a lapse of periodic time may be detected by a notification from the timer 109, and the control processor may be notified of this. Alternatively, the control processor may be notified of the lapse of time by an interrupt from the timer 109, as described above. In step S717, if a time designated by the application processor has elapsed (YES in step S717), the process advances to step S718. If the time has not elapsed (NO in step S717), the process advances to step S722. In step S722, it is determined whether checks of the lapse of periodic time for all the application processors are completed. If the checks are not completed (NO in step S722), the process returns to step S717, and steps S717 and S722 are performed repeatedly until the completion of all the checks. Then, if all the checks are completed (YES in step S722), the process returns to step S701.

As described above, in this embodiment, the processes in steps S701 to S722 are performed continuously to check the event in the power saving mode of the information processing apparatus 101 by polling.

Note that in this embodiment, an operation example has been described in which the control processor operates continuously until the event is detected in order to continue the polling processing. Alternatively, the control processor may operate only when a condition holds on which the processor A 110 confirms the event with a support of hardware or power control unit B 108 in the network subsystem unit 103, and may stop the clock by an instruction to the power control unit B 108 and wait in the rest of the time. For example, if the communication control unit 105 detects packet reception, the control processor may notify the power control unit B 108 of this, in accordance with this, the power control unit B 108 may start clock supply to the processor A 110, and the processor A may confirm a received packet. In the periodic time, the timer 109 notifies the power control unit B 108 for each lapse of a minimum resolution time, and the clock may be supplied to the processor A 110. At this time, the power control unit B 108 may be instructed to stop the operation of the processor A 110 by the control of a self processor or if clock supply is performed due to one factor, an instruction to stop the clock may be given again after the event in question is confirmed. If the control processor can operate so as to avoid an event detection failure with the support of hardware operating in the power saving mode as described above, it may not operate continuously while keeping supplying the clock of the processor A 110.

The procedure upon detection of each event will now be described. First, if the end of the power saving mode is detected in step S701 (YES in step S701), information on a factor leading to the end of the power saving mode is loaded into the local RAM 107 in step S702. When recovering the normal power mode, the power control unit A 104, the Main CPU 118, or the application function unit can read out this information on the end factor from the local RAM 107 and use it to determine a process at the start of the normal power mode. Then, in step S703, the power saving mode end process of the control processor is performed, terminating the process. The power saving mode end process of the control processor in step S703 will now be described with reference to FIG. 8. FIG. 8 is a flowchart showing the procedure of a process in which the control processor ends the power saving mode. The following steps are performed based on the control of a control processor (the processor A 110 in the above-described example).

In step S901, the control processor notifies the application processors of the end of power saving mode. Control is performed such that this allows the processor B and processor C serving as the application processors to end the power saving mode safely. Note that this notification may be made for all the processors B and processor C at once or may be made sequentially as long as a sequence capable of transiting to the normal power mode safely is adopted.

Then, in step S902, a process of terminating the operation of the control processor is performed. This includes a process of stopping the hardware in the network subsystem unit 103 or a process of terminating a control processor program.

Then, in step S903, the control processor determines whether to receive, from all the application processors (the processor B and the processor C in the above-described example) that are notified of the end of the power saving mode, notifications of the completion of the stop process, and waits until the notifications are received. Synchronous processing is performed such that the power saving mode can be terminated safely by this. If it is confirmed that completion notifications are received from all the processors (YES in step S903), the process advances to step S904. Note that the completion notifications may be made by any method. For example, the notifications may be made using the local RAM 107, a queue for notifying each processor may be included, or in addition, a support from the hardware in the network subsystem unit 103 may be received.

Then, in step S904, the control processor instructs the power control unit A 104 to control normal mode power supply, terminating the process. In accordance with this, the power control unit A 104 activates the main system unit 102 to perform a process of transiting from the power saving mode state 202 to the normal power state 201. In the normal power state 201, the plurality of processors 110, 112, and 114 can operate based on execution programs arranged in the RAM 120 serving as a main memory. For example, the dedicated memories A, B, and C may function as caches which store the execution programs temporarily, and the plurality of processors may operate parallelly based on the execution programs. This makes it possible to perform high-speed arithmetic processing in the normal power state 201.

On the other hand, if the control processor detects packet reception in step S705 (YES in step S705), the process advances to step S706. In step S706, protocol processing for the received packet is performed. More specifically, in this processing, the control processor fetches the received packet from the communication control unit 105 to the local RAM 107 and analyzes a header, confirming packet consistency or whether the packet is addressed to a self apparatus. If an inquiry is made by an ARP, Ping, or ICMPv6, a responding packet is generated and transmitted to the remote controller via the network 122.

Then, in step S707, the control processor determines whether a continuous process is still needed for the received packet. If the continuous process is not needed (NO in step S707), the packet is discarded in step S715, and the process advances to step S716. If the continuous process is needed (YES in step S707), the process advances to step S708.

In step S708, the control processor confirms and determines whether the received packet is the packet type or port number set by the Main CPU 118 when transiting to the power saving mode. If the packet is a packet that becomes a factor for recovering the normal power mode (YES in step S708), the process returns to step S702 in which a recovery factor is recorded in the local RAM while holding the received packet, and the information processing apparatus 101 performs a process of recovering the normal power mode. If the packet is not a packet of the recovery factor (NO in step S708), the process advances to step S709.

In step S709, the control processor determines whether the packet is a packet (application processor notification packet) which notifies the application processor. In this process, the control processor determines whether the packet corresponds to the application processor notification packet by determining whether to correspond to a condition set by the Main CPU when transiting to the power saving mode or a condition set by the initialization processing of the application processor. If the packet corresponds to the application processor notification packet (YES in step S709), the process advances to step S710. If the packet does not correspond to the application processor notification packet (NO in step S709), the process advances to step S715 in which the received packet is discarded.

On the other hand, in steps S710 to S714, the control processor performs a process of causing each application processor to perform a process. In this embodiment, an order of performing the process is assigned in advance to the application processors. The control processor passes processing authority to the application processor of the first in order, stopping power supply to the control processor. When an application processor process ends, power supply to the control processor is resumed, returning to a processable state. This allows power saving by limiting the number of processors to which power is supplied concurrently.

In step S710, the control processor first transmits a packet reception notification to the application processor of the first in application processor processing order decided in advance in order to transfer the received packet processing to the application processor process. In this embodiment, an example will be described in which a notification is first made to the processor B. Note that the received packet may be transferred using any method such as a method for transferring only address information while the packet remains stored in the local RAM 107 as long as the packet can be transferred to the processor B. An event notification of the received packet processing notification may be made via the local RAM 107 or via a queue included in a processor in advance. As described above, any method may be used as long as the event notification can be made.

Then, the control processor instructs the power control unit B 108 to perform clock supply to start the operation of the processor B 112 for making the packet reception notification in step S711 and performs an operation stop instruction of the self processor in step S712. If clock supply of the processor B 112 is thus started, the clock of the processor A 110 is stopped, and control is performed so as to limit the number of processors operating concurrently. It is therefore possible to reduce wasteful power consumption. Note that in this embodiment, an example has been described in which the packet reception notifications are transferred to the respective application processors sequentially so that either application processor may execute the received packet processing. However, the present invention is not limited to this. For example, if a specific processor that needs to perform the processing is ascertained in advance in accordance with the type of received packet, the specific application processor may be notified directly. It is considered that the application processor to perform the processing is determined for each IP version such that the processor B 112 performs IPv6 packet processing, and the processor C 114 performs IPv4 packet processing. In this case, the IP version of the packet is confirmed, and a reception notification may be made directly to the application processor corresponding to that version. Then, in accordance with the completion of an event process, the specific application processor that has performed processing notifies the control processor, and instructs the power control unit B 108 to start power supply to the control processor and to stop power supply to the application processor.

Also in a case in which a role is predetermined for each application processor, the packet reception notifications are transferred sequentially, and the application processor may determine whether to transfer the notification to the next processor or whether to process it by itself. For example, even if the roles are determined such that the processor B processes an IPv6 packet, and the processor C processes an IPv4 packet, the packet reception notifications may be transmitted to the application processors sequentially.

In this embodiment, if there is the reversed relationship between the processor B and the processor C in the order of the received packet processes since the notifications of the processing are made sequentially, programs are arranged such that the processor of higher priority first receives the notification. Alternatively, the processing may change back and forth between the application processors by their cooperation, and the plurality of application processors may share and perform the processing.

Then, in step S713, the control processor waits until received packet processing completion notifications are received from the application processors. At this time, control is performed so as to resume clock supply as well together with the completion notifications, and thus in reality, the control processor waits while stopping its operation in this step. Note that a process of notifying the processor B 112 and the processor C 114 of the received packet sequentially is performed, and thus in this case, the control processor receives the completion notification from the processor C 114. If the processing is completed in the processor B 112, however, the completion notification is received from the processor B 112. If the completion notifications are received (YES in step S713), the process advances to step S714.

In step S714, the control processor confirms completion notification information from the application processors and determines whether it is necessary to recover the normal power mode by the application processor process. The control processor determines that it is necessary to recover the normal power mode in a case in which, for example, it becomes necessary to perform a process with a heavy load as a result of the application processor process, a process cannot be completed during the power saving mode, or a process cannot be completed only by hardware operable in the power saving mode. If the mode recovers the normal power mode (YES in step S714), the process returns to step S702. If the mode does not recover the normal power mode (NO in step S714), the process advances to step S715.

On the other hand, if the control processor detects in step S717 a lapse of periodic processing time of the application processor (YES in step S717), the process advances to step S718 in which a periodic event process notification is made to the application processor whose periodic lapse is detected. Then, in step S719, the control processor instructs the power control unit B 108 to start clock supply in order to start the operation of the processor that has received the periodic event process notification. Then, in step S720, the control processor instructs the power control unit B 108 to stop the clock of the self processor. When clock supply to the other processors is thus started, control is performed so as to stop the clock of the processor A and limit the number of processors operating concurrently. This can reduce power consumption.

Then, in step S721, the control processor waits until periodic processing completion notifications are received from the application processors. At this time, control is performed so as to resume clock supply as well together with the completion notifications, and thus in reality, the control processor waits while stopping its operation in this step. If clock supply is resumed, and the periodic processing completion notifications are received (YES in step S721), the process advances to step S722.

In this embodiment, the application processors are thus notified of periodic events. Therefore, if the periodic event time has elapsed concurrently in the plurality of processors, a sequence is obtained in which the processor A detects completion after a notification is made to the processor B, and then the processor C is notified of processing. Therefore, if the processing order of the processor B and processor C is predetermined, programs may be arranged so as to conform to that order, or notifications may be made by fixing an order of priorities. Alternatively, if a program performs one periodic event process across the plurality of processors, the process may be performed by cooperation between the plurality of application processors.

As described above, this embodiment shows the control sequence of the control processor while the information processing apparatus 101 performs a power saving operation. However, a sequence will suffice which can perform control so as to limit the number of processors capable of operating concurrently in the power saving mode.

(Power Saving Mode Operation Processing of Application Processors)

The power saving mode operation processing of the processor B and processor C serving as the application processors will now be described with reference to FIG. 9. FIG. 9 is a flowchart showing the procedure of the power saving mode operation processing of the application processors. The following steps are performed based on the control of the application processors.

In step S801, each application processor determines whether it has received a power saving mode end notification. If the end notification is detected (YES in step S801), the process advances to step S802. If the end notification is not detected (NO in step S801), the process advances to step S803.

In step S803, each application processor determines whether the power reduction control of the self processor is possible. If the reduction control is possible (YES in step S803), the process advances to step S804. If the reduction control is not possible (NO in step S803), the process advances to step S805.

In step S805, each application processor determines whether it has received a periodic event notification. If the application processor has received the periodic event notification (YES in step S805), the process advances to step S806. If application processor has not received the periodic event notification (NO in step S805), the process advances to step S809.

In step S809, each application processor determines whether it has received and detected a received packet processing notification from the control processor. If the application processor has detected the received packet processing notification (YES in step S809), the process advances to step S810. If the application processor has not detected the received packet processing notification (NO in step S809), the process returns to step S801.

Polling processing from steps S801 to S809 is thus performed. In reality, however, each application processor waits while stopping its clock, and thus a confirmation by polling is made only when it receives one of event notifications.

If each application processor detects the end of the power saving mode (YES in step S801), the process advances to step S802 in which the power saving mode end process of the application processor is performed, terminating the process. In this step, a processor end process for transiting to the normal power mode safely is performed.

On the other hand, if each application processor judges that the power reduction control of the self processor is possible (YES in step S803), in step S804, it instructs the power control unit B 108 to stop the clock of the self processor. In this embodiment, an example has been described in which the power reduction control is performed in this step. However, the control may be performed when a notification is made to the other processor, and an instruction to start supplying the clock of the processor that has received the notification is performed. If control can be performed so as to limit the number of processors operating concurrently as described above, any method can be used.

In step S805, if each application processor detects the periodic event notification (YES in step S805), in step S806, a periodic event process is performed by an application process. More specifically, in this process, a process of transmitting a packet to the remote controller for each predetermined time or updating the state of an application is performed. In addition, a needed application process is executed for each predetermined time.

Then, each application processor notifies the processor A 110 serving as the control processor of the completion of the periodic event in step S807, and starts supplying the clock of the processor A 110 to the power control unit B in step S808. Subsequently, in this sequence, after each application processor makes the confirmations in steps S809 and S801, it performs a power reduction instruction of the self processor in step S804 via the determination in step S803. Such a sequence is adopted in this embodiment. However, power reduction processing may be performed concurrently with step S808.

On the other hand, if each application processor detects in step S809 a packet reception notification (YES in step S809), it performs received packet processing in step S810. More specifically, in this step, state update processing by transmission of a response packet in an application process or an instruction from the remote controller and an application process for recovering the normal power mode are performed. Note that in this embodiment, the number of processors operating concurrently is limited, obviating the need to assume a situation in which the other processor transmits/receives a packet. This eliminates the need for exclusive control of packet transfer to the communication control unit 105.

Then, in step S811, each application processor determines whether all the application processes are completed. If all the processes are completed (YES in step S811), the process advances to step S813 in which the control processor is notified of the completion of a packet reception processing regardless of the presence/absence of a succeeding application processor. If the processes are not completed (NO in step S811), the process advances to step S812 in which the packet reception processing is relayed to the succeeding application processor. In this embodiment, if there is succeeding processing in the processor B 112 when the processing is performed in the order of the processor B 112 and the processor C 114, the processor C 114 is notified of this. On the other hand, a succeeding processor does not exist for the processor C 114, and thus a notification is made to the processor A. If the application process is completed in the processor B 112, a notification is made not to the processor C but to the processor A. Note that even if the application processes are completed, notifications may definitely be made to all the processors. After the corresponding processor receives the notification in step S812 or S813, the control processor instructs the power control unit B 108 to control power supply of the processor that has received the notification in step S814, and performs a power reduction control instruction of the self processor in step S804 via steps S801 and S803. The operation of each application processor in the power saving mode is performed with the above sequence.

Note that in this embodiment, the description has been given by letting the processor B and the processor C be the processors operating as the application processors. However, the processor A itself operating as the control processor may also perform an application process. Furthermore, the number of processors need not be the number in this embodiment, and an arrangement will suffice in which operations in the power saving mode are divided and arranged in the respective processors, and power consumption is suppressed by explicitly limiting, with program control, the number of processors operating concurrently.

According to this embodiment, power consumption is cut by shutting down power supply to most of hardware in the power saving mode operation of the information processing apparatus 101. An operation is performed by dividing processes by the plurality of processors and limiting the number of processors operating concurrently. That is, programs in the power saving mode are arranged in the dedicated memories held by the respective processors and operated, securing a program area and limiting the number of processors operating concurrently. This makes it possible to suppress power consumption even in the operation across the plurality of processors. The exclusive control of a resource becomes unnecessary even if the plurality of processors operate, eliminating the need for an implementation with a resource conflict by the other processor being considered when one processor process is performed. An operation can be performed by making effective use of the resource while thus reducing power consumption.

It becomes possible, by transferring the process to the application processors sequentially at the time of packet reception, to perform the process regardless of the processor to which the process is assigned. If the process is completed while making notifications sequentially, efficient processing becomes possible by notifying the control processor of the completion before making the notifications to all the application processors sequentially. Similarly, it becomes possible to reduce transfer between the processors and perform processing efficiently if a specific processor to perform processing is ascertained by directly notifying the corresponding application processor after a lapse of periodic time.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-177865, filed Sep. 12, 2016, which is hereby incorporated by reference herein in its entirety.

What is claimed is:

1. An information processing apparatus configured to operate by switching between a first power mode and a second power mode having less power consumption than the first power mode, the apparatus comprising:
a plurality of processors; and
a plurality of memories provided in correspondence with the plurality of processors, wherein in a case where the information processing apparatus is in the second power mode:
each of the plurality of memories stores a program to be loaded by a corresponding processor of the memory,
in a case where a single processor among the plurality of processors and a single memory corresponding to the single processor operate during a period of nonconcurrent processor operation, the information processing apparatus does not supply power or does not provide any clock to processors and memories other than the single processor and the single memory,
the information processing apparatus is configured to cause, among the plurality of processors, the single processor to operate, and to cause, among the plurality of memories, the single memory corresponding to the single processor to operate during the period of nonconcurrent processor operation,
each of the plurality of processors is configured to be sequentially caused to operate as the single processor by way of a period of concurrent processor operation in which a first processor, which was operating as the single processor before the period of concurrent processor operation, and a second processor, which is to be operated as the single processor after the period of concurrent processor operation, concurrently operate,
when the single processor is caused to operate, all other processors included in the plurality of processors are not caused to operate during the period of nonconcurrent processor operation, and
when the single memory corresponding to the single processor is caused to operate, all other memories included in the plurality of memories are not caused to operate during the period of nonconcurrent processor operation.

2. The apparatus according to claim 1, further comprising a shared memory configured to store the programs to be loaded by the plurality of processors in the second power mode, the programs being accessible by the plurality of processors,
wherein in accordance with the information processing apparatus switching from the first power mode to the second power mode, each of the plurality of processors obtains a program which defines its operation in the second power mode from the shared memory and stores the program in the memory corresponding to the processor.

3. The apparatus according to claim 1, wherein in the second power mode, one of the plurality of processors serves as a control processor, and when the control processor is the single processor caused to operate during the period of nonconcurrent processor operation, the control processor determines, in accordance with occurrence of an event, whether operations of the plurality of processors other than the control processor are needed in order to process the event, and
when the control processor determines that the operations of the plurality of processors other than the control processor are needed to process the event, the control processor transmits a notification of occurrence of the event to one of the plurality of processors other than the control processor, and the information processing apparatus starts power supply to the one of the plurality of processors to begin the period of concurrent processor operation and stops power supply to the control processor to end the period of concurrent processor operation.

4. The apparatus according to claim 3, wherein an order of performing a process of the plurality of processors other than the control processor is predetermined, and
in the second power mode, when the control processor is the single processor caused to operate during the period of nonconcurrent processor operation, and the control processor determines that the operations of the plurality of processors other than the control processor are needed in order to process the event, the control processor transmits a notification of occurrence of the event to a first processor of the plurality of processors other than the control processor, which performs a first process in the order, and the information processing apparatus starts power supply to the first processor to begin the period of concurrent processor operation and stops power supply to the control processor to end the period of concurrent processor operation.

5. The apparatus according to claim 3, wherein the event includes at least one of a timer timeout and packet reception.

6. The apparatus according to claim 1, wherein in the first power mode, execution programs of the plurality of processors are arranged in a main memory, the plurality of memories function as caches configured to store the execution programs temporarily, and the plurality of processors operate parallelly based on the execution programs.

7. A method for controlling an information processing apparatus that includes a plurality of processors and a plurality of memories provided in correspondence with the plurality of processors, and that is configured to operate by switching between a first power mode and a second power mode having less power consumption than the first power mode, wherein in a case where the information processing apparatus is in the second power mode:

each of the plurality of memories stores a program to be loaded by a corresponding processor of the memory, in a case where a single processor among the plurality of processors and a single memory corresponding to the single processor operate during a period of nonconcurrent processor operation, the information processing apparatus does not supply power or does not provide any clock to processors and memories other than the single processor and the single memory, the information processing apparatus is configured to cause, among the plurality of processors, the single processor to operate, and to cause, among the plurality of memories, the single memory corresponding to the single processor to operate during the period of nonconcurrent processor operation, each of the plurality of processors is configured to be sequentially caused to operate as the single processor by way of a period of concurrent processor operation in which a first processor, which was operating as the single processor before the period of concurrent processor operation, and a second processor, which is to be operated as the single processor after the period of concurrent processor operation, concurrently operate, when the single processor is caused to operate, all other processors included in the plurality of processors are not caused to operate during the period of nonconcurrent processor operation, and when the single memory corresponding to the single processor is caused to operate, all other memories included in the plurality of memories are not caused to operate during the period of nonconcurrent processor operation.

8. A non-transitory computer-readable storage medium storing a computer program for an information processing apparatus that includes a plurality of processors and a plurality of memories provided in correspondence with the plurality of processors and that is configured to operate by switching between a first power mode and a second power mode having less power consumption than the first power mode, the computer program, when executed by a processor, causes the information processing apparatus to control power supplied to the plurality of processors and the corresponding plurality of memories, wherein as part of the control of power supplied to the plurality of processors and the corresponding plurality of memories, the executed computer program causes the information processing apparatus to in a case where the information processing apparatus is in the second power mode:

store, in each of the plurality of memories, a program to be loaded by a corresponding processor of the memory, and in a case where a single processor among the plurality of processors and a single memory corresponding to the single processor operate during a period of nonconcurrent processor operation, not supply power or not provide any clock to processors and memories other than the single processor and the single memory, the information processing apparatus is configured to cause, among the plurality of processors, the single processor to operate, and to cause, among the plurality of memories, the single memory corresponding to the single processor to operate during the period of nonconcurrent processor operation, each of the plurality of processors is configured to be sequentially caused to operate as the single processor by way of a period of concurrent processor operation in which a first processor, which was operating as the single processor before the period of concurrent processor operation, and a second processor, which is to be operated as the single processor after the period of concurrent processor operation, concurrently operate, when the single processor is caused to operate, all other processors included in the plurality of processors are not caused to operate during the period of nonconcurrent processor operation, and when the single memory corresponding to the single processor is caused to operate, all other memories included in the plurality of memories are not caused to operate during the period of nonconcurrent processor operation.

* * * * *